United States Patent [19]
Bryan-Brown et al.

[11] Patent Number: 5,928,561
[45] Date of Patent: Jul. 27, 1999

[54] POLYMERS FOR LIQUID CRYSTAL ALIGNMENT

[75] Inventors: Guy P Bryan-Brown; Ian C Sage, both of Malvern; William J Feast; Kathryn E Foster, both of Durham, all of United Kingdom

[73] Assignee: The Secretary of State for Defence in Her Britannic Majesty's Government of the United Kingdom of Great Britain and Northern Ireland, United Kingdom

[21] Appl. No.: 09/029,101

[22] PCT Filed: Sep. 23, 1996

[86] PCT No.: PCT/GB96/02361

§ 371 Date: Feb. 12, 1998

§ 102(e) Date: Feb. 12, 1998

[87] PCT Pub. No.: WO97/13176

PCT Pub. Date: Apr. 10, 1997

[30] Foreign Application Priority Data

Sep. 29, 1995 [GB] United Kingdom .................. 9519860

[51] Int. Cl.[6] ..................... C09K 19/56; G02F 1/1337
[52] U.S. Cl. .................. 252/299.4; 349/123; 349/127; 349/191; 428/1
[58] Field of Search .................. 252/299.4; 349/123, 349/127, 191, 135; 428/1

[56] References Cited

U.S. PATENT DOCUMENTS

| | | | |
|---|---|---|---|
| 5,298,590 | 3/1994 | Isogai et al. | 528/188 |
| 5,350,539 | 9/1994 | Mishina et al. | 252/299.4 |
| 5,443,864 | 8/1995 | Takimoto et al. | 428/1 |
| 5,538,823 | 7/1996 | Park et al. | 430/20 |

FOREIGN PATENT DOCUMENTS

| | | |
|---|---|---|
| A 44 17 409 | 11/1994 | Germany . |
| 4-13115 | 1/1992 | Japan . |
| A2 281 977 | 3/1995 | United Kingdom . |

OTHER PUBLICATIONS

WPIDS 92–069187, 1992.
Japanese Journal of Applied Physics, vol. 31, No. 7 Part 01, Jul. 1, 1992, pp. 2155–2164, XP000371722 Schadt M et al: "Surface–Induced Parallel Alignment of Liquid Crystal by Linearly Polymerized Photopolymers" cited in the application see whole document.

*Primary Examiner*—Shean C. Wu
*Attorney, Agent, or Firm*—Nixon & Vanderhye

[57] ABSTRACT

A method of aligning liquid crystal material by bringing into contact with a thin layer of polymer which contains the anthracenyl group, the polymer having previously been treated with plane polarised ultraviolet light. A liquid crystal cell is described wherein each of the substrates defining two opposing cell walls are coated on their inner surface with a suitable polymer for carrying out the invention. A typical embodiment of the invention would have repeat unit (II).

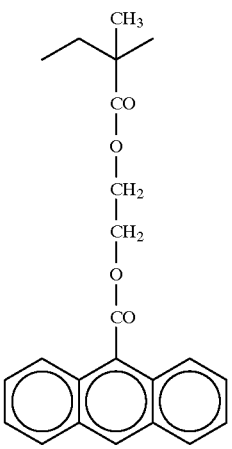

4 Claims, 2 Drawing Sheets

STEP ONE

STEP TWO

STEP THREE

POLYMERS FOR LIQUID CRYSTAL ALIGNMENT

This invention relates to the alignment of liquid crystals.

In order to exploit certain properties of liquid crystals in some of the numerous devices in which they are used, alignment of the liquid crystal molecules is necessary (for example see *J Appl. Phys* 74 3111 (1993)).

For example, in a liquid crystal cell containing a twisted nematic or super twisted nematic material, the material is located between two substrates and alignment of the liquid crystal molecules at the surface of each substrate is necessary.

A thin alignment layer which may be organic (eg a polymer) or inorganic (e.g. SiO) is deposited on each surface. After deposition, alignment of an organic layer may be achieved by unidirectional rubbing of the layer using textile or cloth. Alignment of an inorganic layer such as SiO may be achieved by a suitable choice of evaporation direction.

The substrates may be coated with polyimide by a spinner and then baked to form a cured layer of approximately 50 nm thickness. Each layer is then rubbed, substantially unidirectionally, with suitable material and when liquid crystal material is introduced, the molecules in the vicinity of each layer are aligned in the direction of rubbing. Often it is preferable for the molecules to possess a small angle pre-tilt, typically 2–3°. Sometimes higher pre-tilts are required.

Whilst proving reasonably effective in the alignment of liquid crystal materials, the above method is known to introduce mechanical and electrostatic damage to the active layers. A method of aligning the liquid crystal which does not involve physical contact with the active layers is desirable.

The use of poly(vinyl cinnamate) coatings to effect alignment of liquid crystal materials is documented in, for example, *Jpn J Appl Phys* 31 2155 (1992). Substrates are coated with the polymer and then exposed to plane polarised ultraviolet light. This provides for alignment of liquid crystal material in a direction substantially at right angles to the direction of polarisation of the light.

DETAILED DESCRIPTION OF PREFERRED EMBODIMENTS

According to this invention, a method of aligning liquid crystal material comprises the steps of:

(i) applying a coating of polymer to a substrate;

(ii) exposing said coating to plane polarised ultraviolet radiation and (iii) bringing said liquid crystal material into contact with said exposed coating and is characterised by the polymer having functional groups of the general formula I:

I where $Y=(CH_2)_n$, wherein non adjacent $CH_2$ groups may be replaced by O, $CO_2$, OCO, $OCO_2$, or phenylene;

n may have any integral value from 1 to 16;

An=the anthracenyl group:

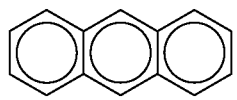

to which Y and X may be connected to at any point:
   each X is independently selected from halogen, alkyl, alkoxy, $CO_2R$, (where R=alkyl, alkenyl, aryl), CN or $NO_2$ and
   m=0 to 6.

Typically the polymers would have the repeat unit:

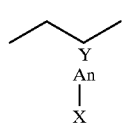

but this is not intended as limiting: for example, other side groups or chains may be present in the polymer (eg the polymer may be a copolymer).

In a preferred embodiment of the invention, the polymer has the repeat unit:

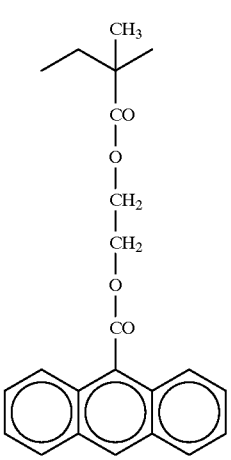

II

According to a second aspect of the invention, a liquid crystal cell is provided which is characterised by the liquid crystal material contained therein being aligned by the method of the first aspect of the invention.

The primary extinction band in the anthracene derivatives lies close to the 254 nm band available from cheap, easily obtained, mercury discharge lamps. Therefore an economical light source can be used, with high efficiency, leading to short exposure times and consequently to fast throughput in production and low unit costs. The absorption peak in PVCi is very weak at these standard wavelengths, leading either to the use of long exposure times and high production costs or to the use of expensive non-standard lamps to accomplish the photochemical crosslinking.

The short wavelength of the anthracene extinction band also leads to very good photochemical stability of cells made using this alignment agent. Standard LC displays are equipped with a polarising filter which has very high extinction (in all polarisations) at this wavelength, but which transmits a small but significant amount of light at the PVCi chromophore wavelength. This bleedthrough of light serves to weaken the alignment strength in the PVCi cell when it is used under conditions of high ambient lighting, but hardly affects the cell with anthracene alignment.

The invention will now be described, by non-limiting example, with reference to FIG. 1, which shows the general reaction scheme used in the synthesis of the polymer used in a particular embodiment of the invention, and FIG. 2 which is a schematic representation of a typical liquid crystal device of the invention.

Step 1
Synthesis of Anthracenecarboxylic Acid Chloride.

Figure 1:
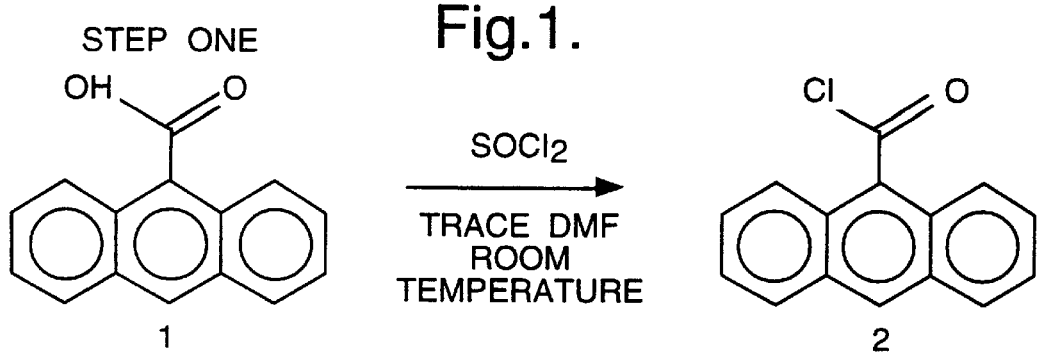
FIG. 1 is reaction scheme for the synthesis of the present polymer.
Figure 1:
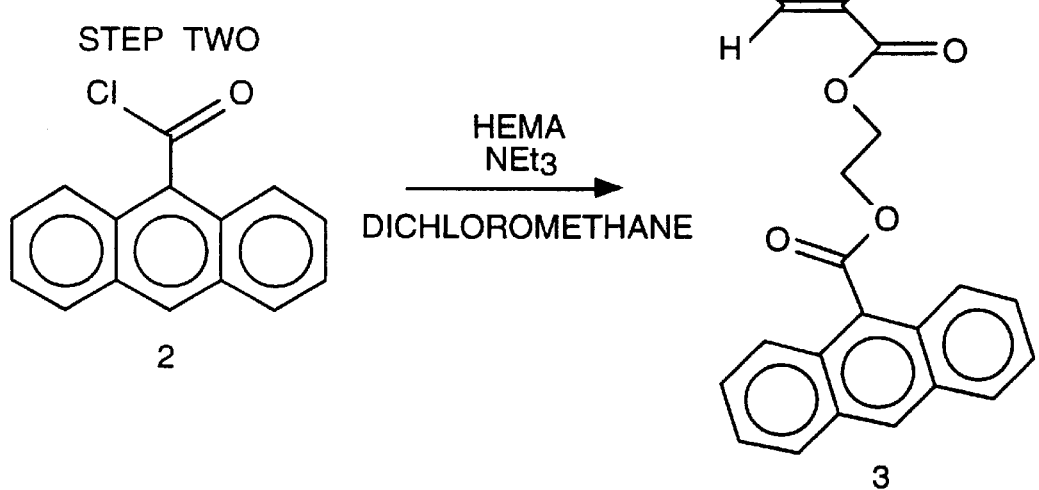
Figure 1:
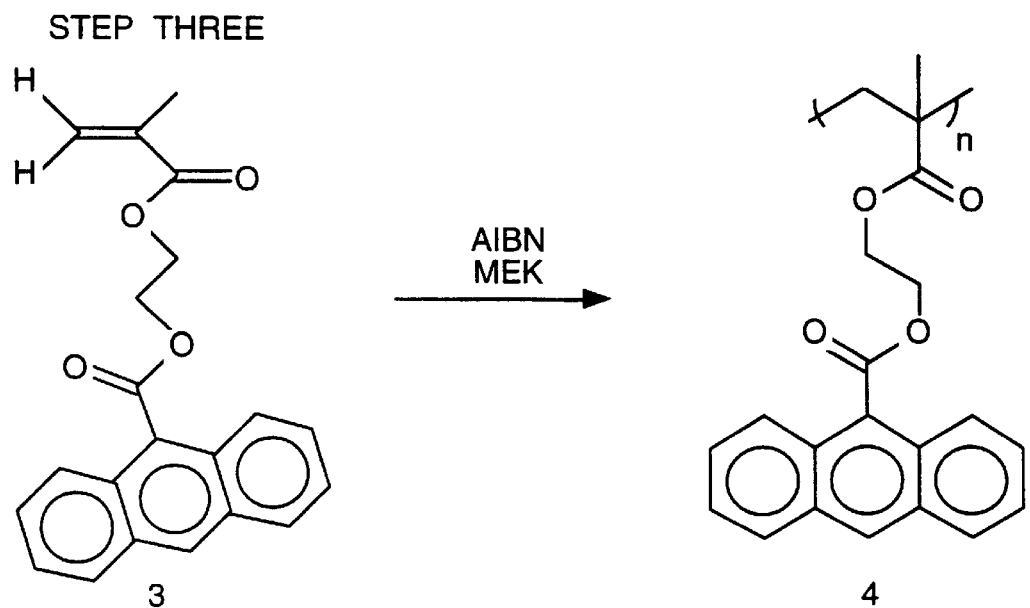

Referring to FIG. 1, thionyl chloride (SOCl$_2$) was purified using standard distillation apparatus with the addition of a scrubbing column attached to the top of the condenser to prevent sulphur dioxide and hydrogen chloride gases from entering the atmosphere. The apparatus was purged with nitrogen at the start. The oil bath was at 120° C. and the distillation head reached 76° C. during the distillation. Colourless thionyl chloride was collected and securely sealed until required.

Anthracenecarboxylic acid 1 was purified by recrystalisation. The anthracenecarboxylic acid was dissolved in a minimum amount of hot ethanol (70° C.), cooled and then placed in a refrigerator overnight. Yellow crystals formed which were collected by filtration and dried by pumping on a vacuum line (10$^{-3}$ mm Hg).

Anthracene acid chloride 2 was synthesised by placing anthracenecarboxylic acid 1 (26.08 g) in a single necked 250 ml round bottomed flask, to which a Claisen head was attached leading to a condenser, a cooled collection flask and a vacuum pump. The Claisen head outlets carried a septum seal and a dropping funnel. Thionyl chloride (80 ml) was placed in the dropping funnel. The apparatus had been purged with nitrogen prior to commencing the experiment. Thionyl chloride was added slowly to the anthracenecarboxylic acid with stirring. After all of the thionyl chloride was added, stirring was continued for a further 10 minutes. A trace amount of N,N-dimethylforamide (DMF) was added through the septum seal using a syringe. The reaction was then left to stir for an hour being continually flushed with nitrogen. The anthracenecarboxylic acid 1 was insoluble in the thionyl chloride but the acid chloride 2 was soluble so when the reaction mixture changed from a yellow suspension to a pale brown solution, the reaction was judged to be complete.

The thionyl chloride was removed using low pressure distillation (50 mmHg, 40° C.), residual thionyl chloride was removed by pumping the flask of acid chloride 2 on a vacuum line overnight (10$^{-3}$ mm Hg).

Step two of the monomer synthesis must be carried out on the next day otherwise the anthracenecarboxylic acid chloride 2 can become partially chlorinated by traces of thionyl chloride and this complicates purification.

Anthracene acid chloride 2 was characterised by melting point, $^1$H, $^{13}$C, IR and mass spectroscopy. The compound is difficult to characterise because, on contact with atmospheric moisture, it reverts back to the carboxylic acid. A melting point of 94.4–96.8° C. was observed. This agrees with the literature value of 93.5–94.5° C. (see J. Org. Chem., Vol. 38, No. 3, 1973, page 483). The correct molecular mass of 240 with the appropriate p+2 for 1 chlorine atom was identified by mass spectroscopy and the fragmentation pattern was consistent with that expected for the anthracene acid chloride 2 (M—CL, 205; M—COCl, 177). The $^1$H and $^{13}$C NMR spectra were consistent with the expected structure (see table 1) but showed some trace impurities.

TABLE 1

NMR Spectrum of Anthracenecarboxylic acid chloride obtained as an intermediate during synthesis of Polymer used in a specific embodiment of the current invention.

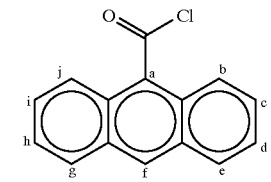

| SHIFT/ppm | MULTIPLICITY | INTEGRAL | ASSIGNMENT |
|---|---|---|---|
| 7.249 | S | | chloroform |
| 7.60 | MULT (Sextet when pure) | 4 | c, d, h, i |
| 8.08 | MULT (Doublet of doublets when pure) | 4 | b, e, g, j |
| 8.572 | S | 1 | f |

The infrared spectrum (KBr) disc shows a strong absorption for the carbonyl group at 1679.5 cm$^{-1}$. There is a peak in the hydroxyl region which may be due to the presence of anthracenecarboxylic acid but it may be due to moisture in the KBr.

Step 2
Synthesis of Monomer

The anthracenecarboxylic acid chloride 2 was then reacted with hydroxyethylmethacrylate (HEMA) in the presence of triethylamine. The acid chloride 2 (26.94 g) was placed in a two-neck round bottom flask and a dropping funnel and condenser were attached to the flask. The apparatus was purged with nitrogen during the entire experiment. Dichloromethane (100 ml) was added to the flask and stirred until all the acid chloride had dissolved. Triethylarnine (8 ml) was added slowly to the flask and left to stir for 20 minutes. Hydroxyethyl methacrylate (8 ml) was mixed with dichloromethane (30 ml) and placed in a dropping funnel. The HEMA solution was then added slowly to the stirring acid chloride 2 solution and then left to stir for two hours after it had all been added. After the reaction, the dichloromethane solution was washed three times with an equal volume of distilled water, dried over anhydrous magnesium sulphate and then filtered. The dichloromethane was removed by rotary evaporation and residual trace of solvent removed by pumping on the vacuum line. The product was recrystalised by dissolving it in a minimum amount of ethanol at room temperature then placing it in a refrigerator. The yellow crystals so obtained were collected by filtration and then dried at room temperature in a vacuum oven.

The product was characterised as the monomer 3 by $^1$H, $^{13}$C NMR IR and mass spectroscopy. The melting point was noted as 63.7–66.2° C.

Mass spectroscopy gave the correct molecular mass of the monomer 3 at 334 and the fragmentation pattern was consistent with that expected for the monomer 3 (M—$C_{15}H_9O$, 205; M—$C_6H_9O_2$, 113).

Table 2 shows the signals obtained from the $^1$H NMR-spectrum.

TABLE 2

Signals obtained in $^1$H NMR spectrum of monomer 3.

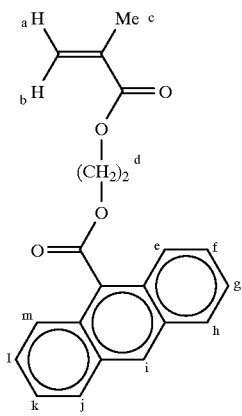

| SHIFT/ppm | MULTIPLICITY | INTEGRAL | ASSIGNMENT |
|---|---|---|---|
| 1.583 | s |  | water |
| 1.993 | S | 1 | c |
| 4.610 | T | 2 | d |
| 4.880 | T | 2 | d |
| 5.643 | S | 1 | a |
| 6.227 | S | 1 | b |
| 7.257 | S |  | chloroform |
| 7.507 | MULT | 4 | f, g, k, l |
| 8.016 | DD | 4 | e, h, j, m |
| 8.541 | S | 1 | i |

Step 3
Synthesis of Homopolymer

A 250 ml flange flask with an overhead electrical stirrer, condenser, thermometer and septum seal attached was set up. The flask also had an inlet and an outlet for nitrogen gas. The apparatus was purged with nitrogen before the experiment and a constant flow of nitrogen was maintained during the experiment. The anthracenyl monomer 3 (15 g) was placed in a flange flask with 2-butanone (50 ml). The mixture was stirred and heated until refluxing (80° C). AIBN (0.096 g) dissolved in 2-butanone (4 ml) was then injected 1 ml every 30 minutes into the reaction mixture via a septum seal using a syringe. After all the AIBN had been added the mixture was left to stir for a further 30 minutes and then left to cool down. The reaction mixture was then added slowly, with stirring, to hexane in order to precipitate the polymer 4. The polymer 4 was dried in a vacuum oven at 40° C., but on characterization was found to contain trapped solvents and residual monomer 3.

In order to remove the residual monomer 3, the polymer 4 was dissolved in a minimum amount of chloroform and then precipitated out into a large amount of stirring ethanol. This was repeated three times before placing the polymer 4 in a vacuum oven ($10^{-3}$ mm Hg) to remove any residual solvent.

Gel Permeation Chromatography (GPC) analysis indicated that the polymer 4 had a number average molecular weight $M_n$ of 13199 daltons and a polydispersity of 2.477.

The IR spectrum showed the ester carbonyl (1725.4 cm$^{-1}$), C-H stretches (2951.5–3052.4 cm$^{-1}$) and the aromatic rings (1142.3–1198.6 cm$^{-1}$).

The $^{13}$C NMR spectrum was complicated but indicated the formation of polymeric material by the increased number of signals in the aliphatic region.

The $^1$H NMRspectrum showed broad peaks characteristic of polymers in places where monomer peaks had been found. Peaks attributed to vinyl protons in the monomer were not present in the polymer spectrum and a peak at 0.707 ppm was seen due to protons on the polymer backbone. A trace amount of ethanol remained, so the polymer 4 was placed in a vacuum oven overnight.

Figure 2:
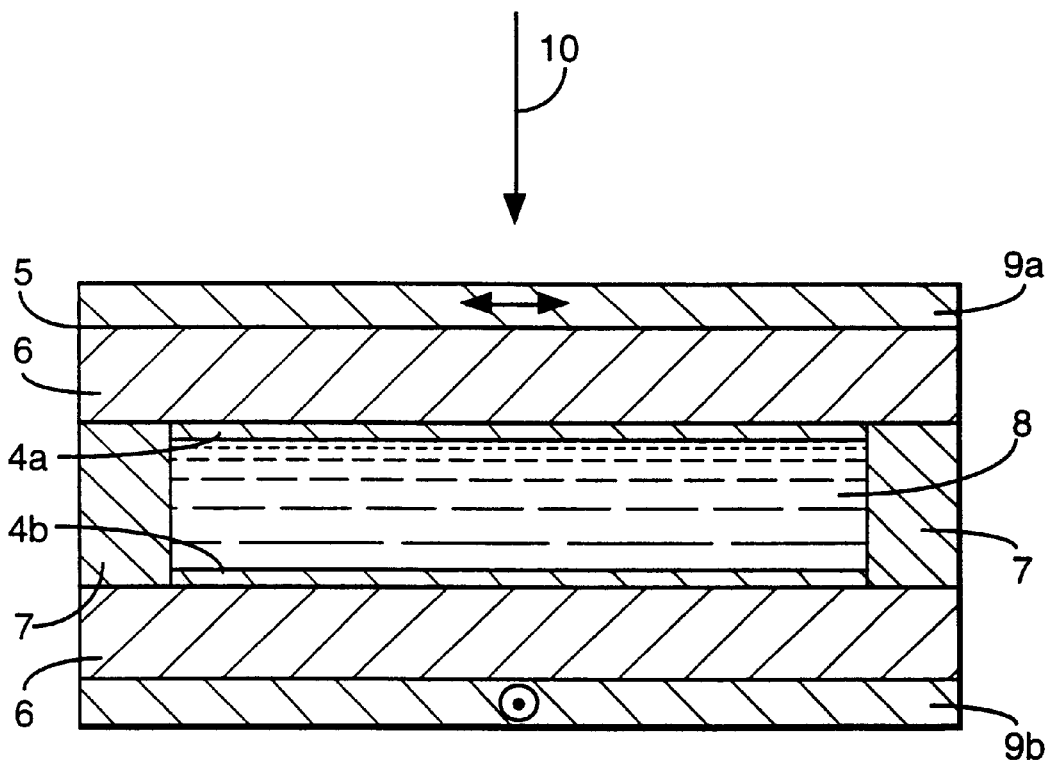
FIG. 2 is a schematic device of the invention.

Referring to FIG. 2, a typical liquid crystal cell 5 of the current invention comprises two glass plates 6, held apart by spacers 7 and sandwiching a five micrometer thick layer of twisted nematic liquid crystal material 8. The glass plates are clad on their outer sides by polarisers 9a and 9b arranged so that their axes of polarisation are mutually perpendicular, the directions of these axes being represented by ←→ (in the plane of the page) and ⊙ (normal to the plane of the page).

The inner surfaces of the glass plates 6 are each clad with a layer of polymer 4a, 4b (typically about 50 nm thick). Before assembly of the cell, the layers of polymer 4a and 4b are each exposed to plane polarised ultraviolet light. The direction of polarisation of the light to which each layer of polymer 4a, 4b is exposed is substantially parallel or at right angles to the axes of polarisation of each corresponding polariser 9a and 9b.

When the liquid crystal material 8 is introduced into cell 5, the material in the vicinity of each layer of polymer 4a and 4b is aligned substantially at right angles to the direction of polarisation of the light to which that layer had been exposed.

Glass plates 6 each incorporate an electrode (not shown) in order to facilitate the application of an electric field across the layer of liquid crystal material 8.

During operation light entering the cell substantially along the direction indicated by arrow 10 is polarised on passing through polariser 9a. As the light then passes through the layer of liquid crystal material 8, in the absence of an electric field, its axis of polarisation is rotated by 90° thus allowing it to leave the cell 5 through polariser 9b.

When an electric field is applied to the layer of liquid crystal material 8 the 90° rotation is removed and substantially no light can pass through polariser 9b.

Experimental Processing and Results obtained from Anthracenyl Polymer

The anthracenyl homopolymer 4 was dissolved in a 50:50 mixture of chlorobenzene and dichloromethane to form a 2% (w/v) solution. Films of the material were then spin coated on to either fused silica or ITO covered glass. Oven baking for 30 minutes at 90° C. ensured that all solvent was removed from the films.

UV/visible spectroscopy was carried out using the polymer layers on silica substrates. This revealed a large absorption at 262 nm and a set of smaller absorptions in the range 320–400 nm. These absorption are as expected and confirm the composition of the polymer.

The samples spun on to glass were exposed to the polarised beam of radiation from a HeCd laser (325 nm). This exposure leads to anisotropic crosslinking in the material which can be monitored by real time measurement of the birefringence. This measurement is made using a second laser beam (HeNe, 633 nm) which intersects the HeCd beam at the sample. The HeNe beam passes through crossed polarisers positioned on either side of the sample which are oriented at ±45° to the polarisation of the HeCd beam. The retardation of the sample can then be calculated from the HeNe laser intensity after the second polariser using the equation:

$$I = I_0 \sin^2\{\pi \Delta n d / \lambda\}$$

Where $I_0$ is the intensity measured using parallel polarisers. Sample thickness can be measured on a Dektak surface profiler and thus allow the refractive index of the polymer to be calculated. In one particular example a polymer layer was exposed for 900 seconds with an incident intensity of 1.2 W/cm². The birefringence was seen to rise monotonically during this time and eventually saturated at a value of 0.012.

Exposed surfaces were then constructed in a TN configuration that allowed assessment of the anchoring energy. One surface relied on photoalignment while the other was a conventional rubbed surface. Cell gaps were typically 10 μm and filling was carried out using a nematic E7, available from Merck chemical co. (formerly BDH), in its isotropic phase. Samples that received a 900 second exposure showed a uniform region of high quality alignment while those exposed for much shorter times (180 seconds) showed shabby alignment. Measurement of the optical twist angle in the cell allowed calculation of the azimuthal anchoring energy. The maximum value obtained was $2.0 \times 10^{-6}$ J/m² which is about 50 times weaker than a typical rubbed polymer.

We claim:

1. In a method of aligning liquid crystal material in a liquid crystal cell comprising the steps of:

(i) applying a coating of polymer to a liquid crystal cell substrate;

(ii) exposing said polymer coating to plane polarized ultraviolet radiation; and (iii) bringing said liquid crystal material into contact with said exposed coating, the improvement wherein said polymer has functional groups of the formula I:

Y
|
An
|
$X_m$ where $Y=(CH_2)_n$ wherein non adjacent $CH_2$ groups may be replaced by O, $CO_2$, OCO, $OCO_2$, or phenylene;

n has an integral value from 1 to 16;

An=the anthracenyl group to which Y and X may be connected to at any point;

each X is independently selected from halogen, alkyl, alkoxy, CN, $NO_2$ or $CO_2R$, where R=alkyl, alkenyl, aryl; and m=0 to 6.

2. In a method of aligning liquid crystal material in a liquid crystal cell comprising the steps of:

(i) applying a coating of polymer to a liquid crystal cell substrate;

(ii) exposing said polymer coating to plane polarized ultraviolet radiation; and (iii) bringing said liquid crystal material into contact with said exposed coating, the improvement wherein said polymer has functional groups of the formula I:

Y
|
An
|
$X_m$ where $Y=(CH_2)_n$ wherein non adjacent $CH_2$ groups may be replaced by O, $CO_2$, OCO, $OCO_2$, or phenylene;

n has an integral value from 1 to 16;

An=the anthracenyl group to which Y and X may be connected to at any point;

each X is independently selected from halogen, alkyl, alkoxy, CN, $NO_2$ or $CO_2R$, where R=alkyl, alkenyl, aryl;

m=0 to 6 and said polymer includes:

Y
|
An
|
$X_m$ .

3. In a method of aligning liquid crystal material in a liquid crystal cell comprising the steps of:

(i) applying a coating of polymer to a liquid crystal cell substrate;

(ii) exposing said polymer coating to plane polarized ultraviolet radiation; and (iii) bringing said liquid crystal material into contact with said exposed coating, the improvement wherein said polymer has functional groups of the formula I:

where Y=(CH$_2$)n wherein non adjacent CH$_2$ groups may be replaced by O, CO$_2$, OCO, OCO$_2$, or phenylene;

n has an integral value from 1 to 16;

An=the anthracenyl group

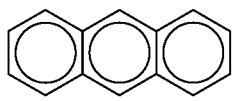

to which Y and X may be connected to at any point;

each X is independently selected from halogen, alkyl, alkoxy, CN, NO$_2$ or CO$_2$R, where R=alkyl, alkenyl, aryl; m=0 to 6 and said polymer includes:

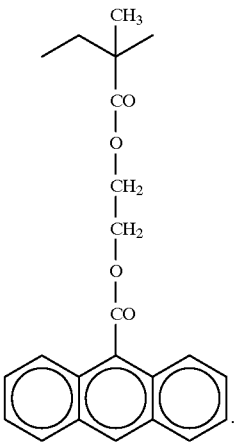

II

4. A liquid crystal cell comprising two substrates and a liquid crystal material contained in said cell, at least one substrate coated by the method of claim 1 thereby aligning the liquid crystal material within the cell.

* * * * *